Patented June 14, 1949

2,473,255

UNITED STATES PATENT OFFICE 2,473,255

PROCESS OF PREPARING MODIFIED PROTEIN

Ivan A. Parfentjev, Nanuet, N. Y., assignor to American Cyanamid Company, New York, N. Y., a corporation of Maine No Drawing. Application January 15, 1946, Serial No. 641,403

3 Claims. (Cl. 195—29)

This invention relates to the modification of proteins whereby they are made especially suitable for alimentation. The invention includes both the new product and the process by which it is made.

During the past several years considerable attention has been given to the problem of supplementing the blood stream with substances which can be utilized in building body tissue. In cases where a patient cannot ingest food in the normal manner for a prolonged period of time it is necessary to supply the protein requirements of the body by intravenous injection of substances which can be formed into tissue by the body. In cases where the patient has suffered from severe loss of blood through accident or surgical operation or by loss of plasma following a serious burn, additional, and sometimes immediate, replenishment of protein matter is necessary.

The oldest and most common method of building up the blood supply is by blood transfusion. This, of course, is cumbersome, expensive, and not always practical. The use of blood plasma, while more convenient, is also open to the same objections. Lately, amino acid therapy has become more commonly adopted as a relatively cheap, convenient, and effective means of introducing substances into the blood stream from which required body proteins can be derived.

Unfortunately, the injection of amino acids into the blood stream is subject to several disadvantages. Most serious is the fact that injection of amino acids tends to cause a lowering of the blood pressure. Amino acids are also more rapidly depleted from the blood by elimination through the kidneys than are other proteinaceous substances such as those of the present invention. The amino acids must be recombined to form body protein before they are of substantial value in rebuilding the body tissue. The amino acid preparation must also contain all of the essential amino acids if full effectiveness is to be obtained and in the usual course of preparation certain of the essential amino acids are destroyed. Most of the commercially available amino acid preparations contain a high proportion of inorganic material which is introduced in their preparation and which cannot be easily removed. This inorganic material further tends to upset the balanced condition of normal blood. Other disadvantages of the use of amino acids in alimentation could also be mentioned.

In accordance with the present invention I have found that insoluble proteins may be modified by proteolytic digestion and subsequent treatment to yield a product particularly suitable for use in supplementing the nitrogen supply of the body. This new material may be injected intravenously without encountering the undesirable reactions which are frequently produced when native proteins or amino acid preparations are injected. The new process of the present invention is conducted in such a way that the original protein material has lost its original physical properties such as iso-electric point, water insolubility, and the like, and is modified immunologically so that it has lost its antigenicity and specificity and is not precipitated with antiserum. The product, however, is not an amino acid preparation but, on the contrary, remains protein. It does not, of course, possess the numerous disadvantages inherent in conventional amino acid preparations.

To prepare the new product of the present invention I select a suitable protein material. Casein is the preferred protein as it is a complete protein that is cheap, available in adequate quantities, is substantially pure and free from extraneous matter which might cause difficulties in the process or in the final product. Other complete proteins such as soy bean meal, liver cake, and the like, may also be used with less advantage. The casein may be freshly precipitated from skim milk prior to use or it may be one of the partially purified casein products of commerce.

The protein material is first digested with a suitable proteolytic enzyme. Of these, pepsin is preferred. Other proteinases may be used but are subject to certain disadvantages. For example, papain, which can be used, requires a coenzyme. Trypsin digests best at a pH from about 7 to 8 which pH range is conducive to the growth of bacteria which might contaminate the digest. This particular enzyme also requires an activator and is not easily removed from the digest. It also tends to digest the protein material to amino acids other than the modified protein desired. Cathepsin is weak and difficult to prepare and rennin digests only to para-casein. It will be obvious, therefore, that pepsin is by far the preferred enzyme.

The hydrogen ion concentration of the digest, i. e. pH value, depends, of course, upon the particular enzyme selected. When using pepsin, the pH range may be from about 2 to about 8. I prefer, however, the lower pH range—from about 2.5 to 3.5.

The temperature of the digestion may vary considerably, from about 0° C. to 50° C., but is preferably around 37° C. At the higher temperatures the digestion is completed in several hours while at the lowest temperature ranges several days may be required. At 37° C. digestion is usually complete to a satisfactory degree in about 12 hours. It will be understood, of course, that the time—temperature relationship is also dependent upon the activity and concentration of the enzyme in the digest.

The concentration of the protein matter in the digest may likewise vary considerably but is preferably from about 0.5% to about 6% by weight of the total aqueous digest.

Digestion is continued until a substantial portion of the insoluble protein matter has become water-soluble at its iso-electric point. Digestion should not continue, however, unnecessarily long because of the danger of excess digestion of protein to amino acids and other degradation products of the protein, which substances are later removed and lost in the process.

After proteolytic digestion of the protein the digest is adjusted to the iso-electric point of the protein material, about 4.6 when using casein. The insoluble matter is then removed by filtration, or otherwise, and the clear solution containing the modified protein is then further treated. If desired, at this stage of the process bacterial antigens which may be present are removed by adsorption on an insoluble magnesium compound such as magnesium hydroxide, magnesium lactate, magnesium pyrophosphate, or the like, as described in my co-pending application, Serial No. 576,704, filed February 7, 1945, and issued as Patent No. 2,454,755. The insoluble magnesium compound is either added to the solution as such or is formed in situ. The amount employed is equivalent to 1 to 5% by weight of dry magnesium hydroxide, based on the weight of the protein solution. The removal of bacterial antigens may take place at a later stage of the process or a plurality of adsorptions of this type may be employed at different stages in the process.

The protein material which remains insoluble at its iso-electric point after proteolytic digestion may be recovered, redigested, and added to the main filtrate, if desired.

The soluble digested protein is, either before or after adsorption of bacterial antigens, precipitated by a salting-out agent, such as ammonium sulfate. Other known salting-out agents, such as sodium sulfate, sodium phosphate, etc., may be used but are not considered efficient. The salting-out procedure is carried out by simply adding about 25% to 35%, preferably 30%, by weight of dry ammonium sulfate or its equivalent of other salting-out agents to the protein solution at neutrality. The precipitated material is removed and the soluble fraction is discarded. Smaller amounts of ammonium sulfate fail to precipitate all of the modified protein whereas larger amounts tend to precipitate proteases and peptone. At different pH levels different amounts of salting-out agent may be used to achieve the same result. These optimum amounts may be easily determined by a small amount of experimentation.

Following precipitation the modified protein is dialyzed to remove the salting-out agent. As dialysis continues the modified protein is redissolved, giving an aqueous solution thereof. This product, if free from bacterial antigens, magnesium salts, pyrogens, and the like, may be used for intravenous injection after adjustment to the desired protein content. Usually, however, the product contains a small amount of soluble magnesium from the bacterial antigen adsorption process which is removed by precipitation with dibasic sodium phosphate or other precipitating agent. Repeated treatments with insoluble magnesium compounds and precipitation with sodium phosphate may be desirable to free the product from the undesirable substances hereinabove mentioned. This precipitation also helps to remove traces of the proteolytic enzyme which may remain as a foreign body and also tends to improve the color of the product.

The product should obviously be tested for pyrogens before use. If pyrogens are found to be present, they may be removed by autoclaving; the product at 15 to 20 lbs. steam pressure (about 120° C. or higher) for one half hour, or more, as may be required.

In order that the invention may be more easily understood the following examples of the process are given.

Example 1

Fifteen liters of pasteurized skim milk was acidified to pH 4.5 with 800 cc. N/HCl. The casein precipitate was washed four times with distilled water and finally resuspended in distilled water to the original volume.

The material was digested overnight at 37° C. by adding 2 grams of pig pepsin and 175 cc. concentrated lactic acid, pH 2.8 (at end of digestion period the pH was 3.1). It was then partially neutralized to pH 4.6, preserved with 0.8% ether phenol, and filtered at room temperature. After further neutralization to orange to phenol red, the filtrate was adsorbed for about one hour with magnesium lactate (20% magnesium hydroxide plus concentrated lactic acid) at pH 9.0 Following adsorption, the filtrate was adjusted to neutrality and precipitated with 30% ammonium sulfate.

The precipitate remaining after digestion was resuspended in distilled water to 6 liters and digested again overnight with 1 gm. of pig pepsin at pH 2.3 (ended at pH 2.8). It was neutralized to pH 4.5, filtered, and the filtrate absorbed with magnesium lactate in the manner described above, and, finally, precipitated with 30% ammonium sulfate.

The two ammonium sulfate solutions were allowed to stand several hours during which time the precipitate formed a thin layer at the top of the liquid. The precipitates were collected, placed in a cellophane bag with the addition of very little water and dialyzed overnight in cold running water. The precipitate did not dissolve readily; it was removed the following day, adjusted to neutrality and placed in dialysis bags again overnight, after which the remaining precipitate was worked into solution. The pH was adjusted to neutrality and the material was dialysed a third day in cellophane tubes in cold running water. From this point on all vessels were rinsed with pyrogen free water.

1.8 liters of dialysed material were obtained.

Most of the magnesium was precipitated out by adding 180 cc. of a 20% solution of dibasic sodium phosphate. However, since an excess of sulfate was still present, the material was dialysed another day in cold running water in cellophane tubes (that had been soaked in 10% phenol). Following this dialysis, the casein was free from sulfate. The material (2400 cc.) which contained 5.70 mg. nitrogen per cc. was Berkefeld filtered and dried.

The dried product (from 1800 cc.) was dissolved in pyrogen free water to 375 cc. and the remaining magnesium was removed with dibasic sodium phosphate. It was then Berkefeld filtered. It contained 24.48 mg. nitrogen and 2.612 mg. tryptophane per cubic centimeter.

Although the sterility test was satisfactory, the product was found to contain pyrogens. A 50 cc. sample of this modified casein was autoclaved ½ hour at 15 lb. (ph 7.4) and refiltered (Berk. N) to remove a slight precipitate which formed. Following this treatment, the material was pyrogen free and showed no change in tryptophane content.

Example 2

Thirty-seven liters of milk were precipitated with 2200 ml. of N/HCl at pH 4.6. The precipitated casein so obtained was washed twice with 4 volumes of distilled water and finally resuspended in distilled water to 23 liters. It was then digested at 37° C. by the addition of 5 grams of crude pig pepsin and 280 ml. of concentrated lactic acid to bring the pH to 2.85. At intervals, it was necessary to add more lactic acid to keep the pH around 3. The total amount required was 550 ml. After 3 hours the material was 50% digested, while after 9 hours digestion was 70%. At this point the casein (pH 3.1) was moved to the chillroom for about 12 hours. The digested casein had a volume of 25 liters.

During the process of digestion the bacterial count was reduced considerably although no preservative had been added.

Following digestion, the digested casein was diluted with 15 liters of pyrogen free water, adjusted to pH 4.65 by addition of 4.45 l. N/NaOH and centrifuged. The supernatant—37 liters—was then adsorbed approximately 2 hours at room temperature with magnesium lactate (3.7 liters of 10% magnesium hydroxide suspension containing 14.82% solids plus 600 ml. concentrated lactic acid—pH 8.5—9.0). It was again centrifuged and the supernatant adjusted pink to phenol red by adding 400 ml. N/HCl.

The adsorbed product amounting to 34 l. was then precipitated with 11 kg. ammonium sulfate (about 30%, sp. gr. 1.155) and the precipitate was resuspended in 4.0 l. of pyrogen free water. After adjusting the pH pink to phenol red with 28 cc. N/NaOH, the material was dialysed overnight in cold running water. During dialysis the volume increased to 7.9 liters. The material was found to be free from sulfate but contained magnesium, apparently remaining after adsorption with magnesium lactate. Most of the magnesium was precipitated out by dibasic sodium phosphate (80 grams dissolved in about 300 cc. pyrogen free water). After standing about 1 hour at 4° C. the casein was centrifuged, adjusted to the desired pH—orange to phenol red with 45 cc. N/HCl, and filtered thru a 7 lb. Mandler filter. The material—7.7 liters—was then frozen and dried.

The dried casein was resuspended in pyrogen free water to 790 ml. It was very turbid, milky, and had a tendency to settle in layers. After overnight dialysis in distilled water in cellophane bags that had been soaked in phenol and rinsed with pyrogen free water, the volume increased to 1410 ml., pH 7.1. It was adjusted to pH 6.9 (17.5 cc. N/HCl) centrifuged, and the supernatant, about 1250 ml. (pH 6.5) filtered thru a 10 lb. Mandler filter. Following this, it was sterilized 20 minutes at 15 lb. (121° C.). A heavy dark green liquid which separated out during autoclaving was allowed to settle overnight at 4° C. and the supernatant was removed by siphoning. About 1100 ml. (pH 6.8) were obtained in this way, the remainder was then filtered thru a porcelain top fine Allen filter. The modified casein was somewhat opalescent and yellow in color. Analysis of it was as follows:

| | |
|---|---|
| Total solids | per cent 10.25 |
| Total nitrogen | mg./cc. 15.60 |
| Tryptophane | mg./cc. 1.777 |
| Ash | per cent 0.44 |

As will be obvious, the product may be also administered intraperitoneally, per os, and per annus. The protein content may therefore be varied over a wide range as may be suitable for these different methods of administration.

I claim:

1. A process of preparing protein for alimentation which comprises digesting casein with pepsin at a pH within the range 2 to 8 until a substantial portion of the digested material is water-soluble at pH 4.6, adding ammonium sulfate to an aqueous solution of the water-soluble digested fraction until it contains about 25% to 35% by weight of ammonium sulfate, based on the weight of the digested casein solution, to precipitate a protein fraction, free of antigenicity and specificity separating the precipitated protein from its mother liquor, removing the ammonium sulfate from the precipitated protein by dialysis and redissolving the protein in water.

2. A process of preparing protein for alimentation which comprises digesting an insoluble, complete protein with pepsin at a pH within the range 2 to 8 until a substantial portion of the digested material is water-soluble at its iso-electric point, mixing an insoluble magnesium compound in an amount equivalent to about 1 to 5% by weight of dry magnesium hydroxide with an aqueous solution of the solubilized protein and agitating the mixture, separating the insoluble magnesium compound and adsorped bacterial antigens from the protein solution, adding ammonium sulfate to the said solution until the solution contains from about 25% to 35% by weight of ammonium sulfate whereby a protein fraction free of antigenicity and specificity is precipitated, separating the precipitated protein material from its mother liquor, removing the ammonium sulfate from the precipitated protein by dialysis, and redissolving the soluble protein in water.

3. A process of preparing protein for alimentation which comprises digesting casein with pepsin at a pH within the range 2 to 8 until a substantial portion of the digested material is water-soluble at its iso-electric point, mixing an insoluble magnesium compound in an amount equivalent to about 1 to 5% by weight of dry magnesium hydroxide with an aqueous solution of the soluble protein and agitating the mixture, separating the insoluble magnesium compound and adsorbed bacterial antigens from the solution, adding ammonium sulfate to the protein solution until the solution contains from about 25% to 35% by weight of ammonium sulfate whereby a protein fraction free of antigenicity and specificity is precipitated, separating the precipitated protein material from its mother liquor, removing the ammonium sulfate from the precipitated protein by dialysis, and redissolving the soluble protein in water.

IVAN A. PARFENTJEV.

REFERENCES CITED

The following references are of record in the file of this patent:

UNITED STATES PATENTS

| Number | Name | Date |
|---|---|---|
| 750,832 | Dunham | Feb. 2, 1904 |
| 2,175,090 | Parfentjev | Oct. 3, 1939 |
| 2,364,008 | Stuart | Nov. 28, 1944 |

FOREIGN PATENTS

| Number | Country | Date |
|---|---|---|
| 543,604 | Germany | 1932 |
| 115,354 | Australia | 1942 |

OTHER REFERENCES

Whitmore, Organic Chemistry, 3rd printing, 1937, D. Van Nostrand Co., Inc., 250 Fourth Ave., N. Y., page 612.

Ecker et al., Studies on the Adsorption of Diphtheria Toxin to and Elution from Magnesium Hydroxide, J. Immunol, 22 (1932), pages 61–66.